US008924060B2

(12) United States Patent
Yamamoto et al.

(10) Patent No.: US 8,924,060 B2
(45) Date of Patent: Dec. 30, 2014

(54) CONTROL DEVICE FOR HYBRID VEHICLE, AND HYBRID VEHICLE INCORPORATING CONTROL DEVICE

(75) Inventors: Masaya Yamamoto, Kasugai (JP); Yuu Nakao, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 267 days.

(21) Appl. No.: 13/639,495

(22) PCT Filed: Apr. 7, 2010

(86) PCT No.: PCT/JP2010/056299
§ 371 (c)(1),
(2), (4) Date: Oct. 4, 2012

(87) PCT Pub. No.: WO2011/125186
PCT Pub. Date: Oct. 13, 2011

(65) Prior Publication Data
US 2013/0024063 A1    Jan. 24, 2013

(51) Int. Cl.
*B60L 11/00* (2006.01)
*B60L 9/00* (2006.01)
(Continued)

(52) U.S. Cl.
CPC ............... *B60W 10/06* (2013.01); *Y02T 10/54* (2013.01); *Y02T 10/6286* (2013.01); *B60W 10/26* (2013.01); *B60W 20/00* (2013.01); *B60W 10/08* (2013.01); *B60W 30/192* (2013.01); *B60W 2710/086* (2013.01); *B60W 20/102* (2013.01); *Y10S 903/93* (2013.01)
USPC ..................... 701/22; 180/65.23; 180/65.265; 903/930

(58) Field of Classification Search
USPC ......... 701/22, 34.4, 32.7, 113, 99; 180/65.23, 180/65.265, 165, 65.29, 65.21, 65.22, 180/65.285, 65.275, 65.1, 65.28; 903/930; 307/66, 10.7, 9.1
See application file for complete search history.

(56) References Cited

U.S. PATENT DOCUMENTS 8,049,367 B2 * 11/2011 Izumi et al. .................... 307/66
8,256,547 B2 *  9/2012 Ichikawa ................... 180/65.29
(Continued)

FOREIGN PATENT DOCUMENTS

JP       2008-163867 A       7/2008
JP       2008 285116     *  11/2008
(Continued)

OTHER PUBLICATIONS

International Search Report mailed May 18, 2010 of PCT/JP2010/056299.

Primary Examiner — Thomas G Black
Assistant Examiner — Robert Payne
(74) Attorney, Agent, or Firm — Kenyon & Kenyon LLP

(57) ABSTRACT

An ECU uses a map or the like prepared in advance to calculate discharge allowable power indicating electric power that can be discharged from a power storage device. When the running mode is at the CD mode and an engine is stopped, the ECU increases the discharge allowable power to a predetermined value. Furthermore, even when the running mode is at the CS mode or even when the engine is operating, the ECU increases the discharge allowable power when a catalyst device provided at an exhaust pipe of the engine is currently warmed up.

12 Claims, 8 Drawing Sheets

(51) Int. Cl.
  *G05D 1/00* (2006.01)
  *G05D 3/00* (2006.01)
  *G06F 17/00* (2006.01)
  *G06F 7/00* (2006.01)
  *B60W 10/26* (2006.01)
  *B60W 10/06* (2006.01)
  *B60W 10/08* (2006.01)
  *B60W 30/192* (2012.01)
  *B60W 20/00* (2006.01)

(56) References Cited

U.S. PATENT DOCUMENTS

| | | | |
|---|---|---|---|
| 8,781,665 B2 * | 7/2014 | Yamamoto et al. | 701/22 |
| 8,798,832 B2 * | 8/2014 | Kawahara et al. | 701/22 |
| 2002/0179354 A1 * | 12/2002 | White | 180/165 |
| 2009/0288896 A1 * | 11/2009 | Ichikawa | 180/65.265 |
| 2010/0019569 A1 * | 1/2010 | Izumi et al. | 307/9.1 |
| 2011/0313613 A1 * | 12/2011 | Kawahara et al. | 701/29 |

FOREIGN PATENT DOCUMENTS

| | | | |
|---|---|---|---|
| JP | 2008-285116 A | | 11/2008 |
| JP | 2009 166513 | * | 7/2009 |
| JP | 2009-166513 A | | 7/2009 |
| JP | 2010 070030 | * | 2/2010 |
| JP | 2010-070030 A | | 4/2010 |

* cited by examiner

FIG.6

NON- CATALYST WARM-UP

|  | CD MODE | CS MODE |
|---|---|---|
| ENGINE CURRENTLY STOPPED | INCREASE | NON-INCREASE |
| ENGINE CURRENTLY OPERATING | NON-INCREASE | NON-INCREASE |

FIG.7

DURING CATALYST WARM-UP

|  | CD MODE | CS MODE |
|---|---|---|
| ENGINE CURRENTLY STOPPED | INCREASE | INCREASE |
| ENGINE CURRENTLY OPERATING | INCREASE | INCREASE |

FIG.8

| CD MODE | CS MODE |
|---|---|
| Wout INCREASED VALUE | Wout NON-INCREASED VALUE |

CONTROL DEVICE FOR HYBRID VEHICLE, AND HYBRID VEHICLE INCORPORATING CONTROL DEVICE

This is a 371 national phase application of PCT/JP2010/056299 filed 7 Apr. 2010, the contents of which are incorporated herein by reference.

TECHNICAL FIELD

The present invention relates to a control device for a vehicle, and a hybrid vehicle incorporating the control device. Particularly, the present invention relates to a control device for a hybrid vehicle incorporating an internal combustion engine and an electric motor as the power source, and a hybrid vehicle incorporating the control device.

BACKGROUND ART

Hybrid vehicles are attracting attention as environment-friendly vehicles. A hybrid vehicle incorporates a power storage device, an inverter, and an electric motor driven by the inverter, in addition to a conventional internal combustion engine, as the power source for traction Such a hybrid vehicle is provided with a catalyst device, as long as an internal combustion engine is mounted, for the purpose of purifying the exhaust gas from the internal combustion engine, likewise with a conventional vehicle that incorporates just an internal combustion engine as the driving source. A catalyst device can generally purify the regulation-subject component in the exhaust gas at the point of time when the catalyst temperature is increased by the exhaust gas of the internal combustion engine and the catalyst is activated. In other words, the catalyst device must be warmed up prior to use.

Japanese Patent Laying-Open No. 2008-163867 (PTL 1) discloses a method that can improve the regulation-subject component discharged during warm-up of a catalyst device in a hybrid vehicle. When a determination is made that the catalyst device is currently warmed up at the hybrid vehicle, running at a power mode that is one of a plurality of running modes is prohibited. Accordingly, increase of the exhaust gas from the internal combustion engine is suppressed. Therefore, the regulation-subject component that will be discharged without being processed sufficiently by the catalyst of the catalyst device can be improved (refer to PTL 1).

CITATION LIST

Patent Literature

PTL 1: Japanese Patent Laying-Open No. 2008-163867

SUMMARY OF INVENTION

Technical Problem

There is a demand for a hybrid vehicle to run in a state where the internal combustion engine is stopped as much as possible. Recently, attention is focused on the so-called plug-in hybrid vehicle that allows a vehicle-mounted power storage device to be charged from a power supply external to the vehicle. The aforementioned demand is particularly immense in such plug-in hybrid vehicles (hereinafter, a vehicle running using the electric motor alone with the internal combustion engine stopped is referred to as "EV (Electric Vehicle) running", whereas a vehicle running with the internal combustion engine operated is referred to as "HV (Hybrid Vehicle) running").

For the purpose of improving the sense of EV running by suppressing the frequency of starting the internal combustion engine, the electric power that can be discharged by the power storage device (hereinafter, referred to as "discharge allowable power Wout") can be modified based on a running mode including a first mode in which EV running is given priority (hereinafter, also referred to as "charge depleting (CD) mode"), and a second mode in which the internal combustion engine is operated and the SOC (State of Charge) of the power storage device is maintained at a predetermined target (hereinafter, referred to as "charge sustaining (CS) mode"), as well as the operation/stop of the internal combustion engine. Specifically, when the running mode is at the CD mode and the internal combustion engine is stopped, the discharge allowable power Wout is increased than when the running mode is at the CD mode and the internal combustion engine is operated, or than when at the CS running mode, allowing the frequency of starting the internal combustion engine to be suppressed to improve the sense of EV running.

However, in the case where warm-up of the catalyst device is initiated to prepare for HV running when the running mode is at the CD mode and the internal combustion engine is stopped, i.e., when the discharge allowable power Wout is increased, discharge allowable power Wout returns to the non-increased state by the internal combustion engine being started to warm up the catalyst device. If the vehicle required power is greater than the discharge allowable power Wout (non-increase state) at this stage, the warm-up of the catalyst device will be interrupted, leading to the problem that HV running is initiated with the catalyst device not yet warmed up.

In view of the foregoing, an object of the present invention is to extend EV running and to prevent interruption of warm-up of a catalyst device in a hybrid vehicle.

Solution to Problem

According to the present invention, a control device for a hybrid vehicle includes a running mode control unit, and a discharge allowable power control unit. The hybrid vehicle includes an internal combustion engine generating vehicle driving force, a power storage device capable of being charged and discharged, an electric motor receiving supply of electric power from the power storage device to generate vehicle driving force, and a catalyst device purifying exhaust gas of the internal combustion engine by catalysis. The running mode control unit controls switching of a running mode including a CD mode in which the internal combustion engine is stopped and running using the electric motor alone is given priority, and a CS mode in which the internal combustion engine is operated and a state of charge indicating a charging state of the power storage device is maintained at a predetermined target. The discharge allowable power control unit modifies discharge allowable power Wout based on the running mode, operation/stop of the internal combustion engine and whether the catalyst device is currently warmed up or not.

Preferably, when the running mode is at the CD mode and the internal combustion engine is stopped, the discharge allowable power control unit increases discharge allowable power Wout than when the running mode is at the CD mode and the internal combustion engine is operated, or than when the running mode is at the CS mode. Furthermore, even when the running mode is at the CD mode and the internal combustion engine is operated, or even when the running mode is at the CS mode, the discharge allowable power control unit increases discharge allowable power Wout in the case where the catalyst device is currently warmed up, likewise with when the running mode is at the CD mode and the internal combustion engine is stopped.

Preferably, when the running mode is at the CD mode and the internal combustion engine is stopped, the discharge allowable power control unit increases discharge allowable power Wout than when the running mode is at the CD mode and the internal combustion engine is operated or than when the running mode is at the CS mode. In the case where starting of the internal combustion engine is required when the running mode is at the CD mode, the warm-up of the catalyst device is initiated while increase of discharge allowable power Wout is maintained. After ending warm-up of the catalyst device, the discharge allowable power control unit returns discharge allowable power Wout to the non-increase state.

Further preferably, when the running mode is at the CD mode and the internal combustion engine is stopped, the discharge allowable power control unit increases discharge allowable power Wout than when the running mode is at the CD mode and the internal combustion engine is operated, or than when the running mode is at the CS mode. When switching from the CD mode to the CS mode, warm-up of the catalyst device is initiated while maintaining increase of discharge allowable power Wout. After ending warm-up of the catalyst device, the discharge allowable power control unit returns discharge allowable power Wout to the non-increase state.

Preferably, a hybrid vehicle further includes a charging device configured to receive supply of electric power from a power supply external to the vehicle to charge the power storage device. The running mode control unit sets the running mode at the CD mode after the power storage device is charged by the charging device.

Furthermore, according to the present invention, a hybrid vehicle includes any of the control device set forth above.

Advantageous Effects of Invention

In the present invention, discharge allowable power Wout is modified based on the running mode, the operation/stop of the internal combustion engine, and whether the catalyst device is currently warmed up or not. Therefore, when the running mode is at the CD mode and the internal combustion engine is stopped, discharge allowable power Wout is increased than when the running mode is at the CD mode and the internal combustion engine is operated, or than when the running mode is at the CS mode. Furthermore, even when the running mode is at the CD mode and the internal combustion engine is operated, or when the running mode is at the CS mode, discharge allowable power Wout can be increased in the case where the catalyst device is currently warmed up, likewise with when the running mode is at the CD mode and the internal combustion engine is stopped. Therefore, the warm-up of the catalyst device will not be interrupted by discharge allowable power Wout returned to the non-increase state. According to the present invention, EV running can be extended and interruption of warm-up of the catalyst device can be prevented.

BRIEF DESCRIPTION OF DRAWINGS

FIG. 6 is a diagram to describe increase/non-increase of the discharge allowable power according to the running mode and operation/stop of the engine.

FIG. 7 is a diagram to describe discharge allowable power during warm-up of a catalyst device.

FIG. 8 represents discharge allowable power employed in a stop determination of the engine.

DESCRIPTION OF EMBODIMENTS

Figure 1:
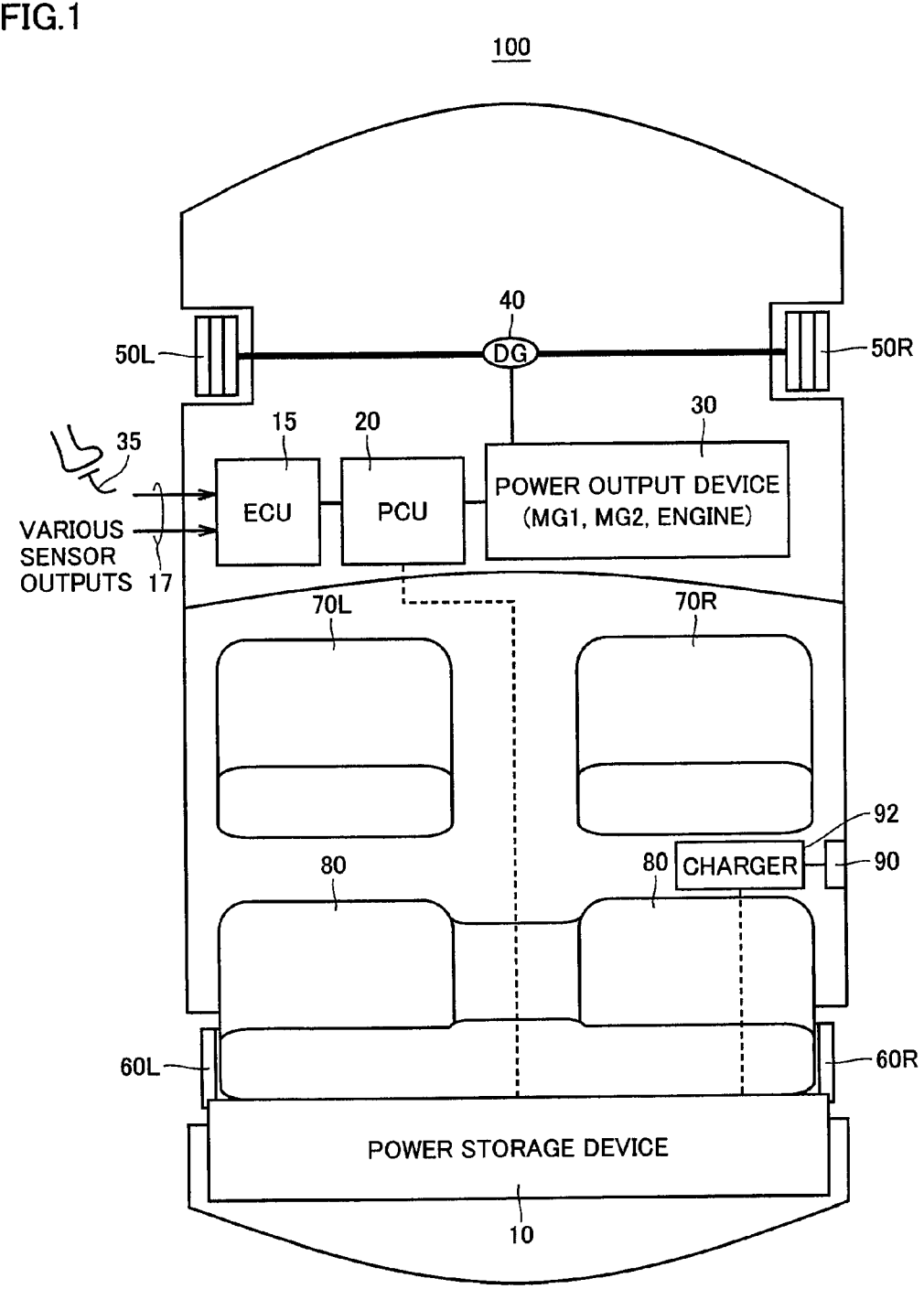
FIG. 1 is a block diagram representing an entire configuration of a hybrid vehicle to which a control device according to an embodiment of the present invention is applied.

Embodiments of the present invention will be described in detail hereinafter with reference to the drawings. In the drawings, the same or corresponding elements have the same reference characters allotted, and description thereof will not be repeated.

FIG. 1 is a block diagram representing an entire configuration of a hybrid vehicle to which a control device according to an embodiment of the present invention is applied. Referring to FIG. 1, a hybrid vehicle 100 includes a power storage device 10, an ECU (Electronic Control Unit) 15, a PCU (Power Control Unit) 20, a power output device 30, and a differential gear (hereinafter, also referred to as DG) 40. Hybrid vehicle 100 further includes front wheels 50L and 50R, rear wheels 60L and 60R, front seats 70L and 70R, a rear seat 80, a charging inlet 90, and a charger 92.

Power storage device 10 is a rechargeable DC power source, formed of a secondary battery such as nickel-metal hydride or lithium ion. Power storage device 10 is disposed at a rear side region of rear seat 80 for example, and electrically connected with PCU 20 to supply DC voltage thereto. Power storage device 10 receives electric power generated by power output device 30 from PCU 20 to be charged. Power storage device 10 is also charged by a charger 92 connected to a charging inlet 90 and receiving electric power supplied from a power supply external to the vehicle. Hereinafter, the power supply external to the vehicle is referred to as "external power supply", and the charging of power storage device 10 by the external power supply is referred to as "external charging".

PCU 20 generically shows a power converter required in hybrid vehicle 100. PCU 20 includes a converter boosting the voltage supplied from power storage device 10, an inverter driving a motor generator included in power output device 30, and the like.

ECU 15 receives various sensor outputs 17 from various types of sensors indicating the driving state and vehicle state. Various sensor outputs 17 include the accelerator pedal position corresponding to the stepping amount on an accelerator pedal 35, the vehicle speed according to the rotational speed of the wheels, and the like. ECU 15 executes various control related to hybrid vehicle 100 based on such sensor outputs applied.

Power output device 30 is provided as the driving source of the wheels, and includes motor generators MG1 and MG2 and an engine. These components are mechanically coupled via a power split device (not shown). In accordance with the running state of hybrid vehicle 100, distribution and coupling of the driving force are implemented among the aforementioned three components via the power split device. As a result, front wheels 50L and 50R are driven. DG 40 transmits the motive power output from power output device 30 to front wheels 50L and 50R, and transmits the rotational force from front wheels 50L and 50R to power output device 30. Accordingly, power output device 30 transmits the motive power from the engine and motor generator to front wheels 50L and 50R via DG 40 to drive front wheels 50L and 50R. Power output device 30 receives the rotational force of the motor generator by front wheels 50L and 50R to generate power and provide the generated power to PCU 20.

Motor generators MG1 and MG2 may function as a power generator and an electric motor. Motor generator MG1 operates mainly as a power generator, and motor generator MG2 operates mainly as an electric motor. Specifically, motor generator MG1 receives some of the output from the engine distributed by the power split device for generating power. Motor generator MG1 receives supply of electric power from power storage device 10 to operate as an electric motor for cranking up and starting the engine.

Motor generator MG2 is driven by at least one of the electric power stored at power storage device 10 and the electric power generated by motor generator MG1. The driving force of motor generator MG2 is transmitted to the driving shaft of front wheels 50L and 50R via DG 40. Accordingly, motor generator MG2 assists the engine for driving the vehicle, or for driving the vehicle by its own driving force alone. In a vehicle braking mode, motor generator MG2 is driven by front wheels 50L and 50R to operate as a power generator. At this stage, the electric power generated by motor generator MG2 charges power storage device 10 via PCU 20.

PCU 20 responds to a control instruction from ECU 15 to boost the DC voltage received from power storage device 10, and convert the boosted DC voltage into AC voltage to drive motor generators MG1 and MG2 in power output device 30. In a regenerative operation mode of motor generators MG1 and MG2, PCU 20 responds to a control instruction from ECU 15 to convert the AC voltage generated by motor generators MG1 and MG2 into DC voltage for charging power storage device 10.

Charging inlet 90 is configured to allow connection with the connector of a charging cable (not shown) connected to an external power supply. At the time of external charging, electric power is received from an external power supply connected to charging inlet 90. The received electric power is supplied to charger 92. Charger 92 located between charging inlet 90 and power storage device 10 converts the electric power supplied from the external power supply connected to charging inlet 90 to the level of the voltage of power storage device 10 for output thereto.

Figure 2:
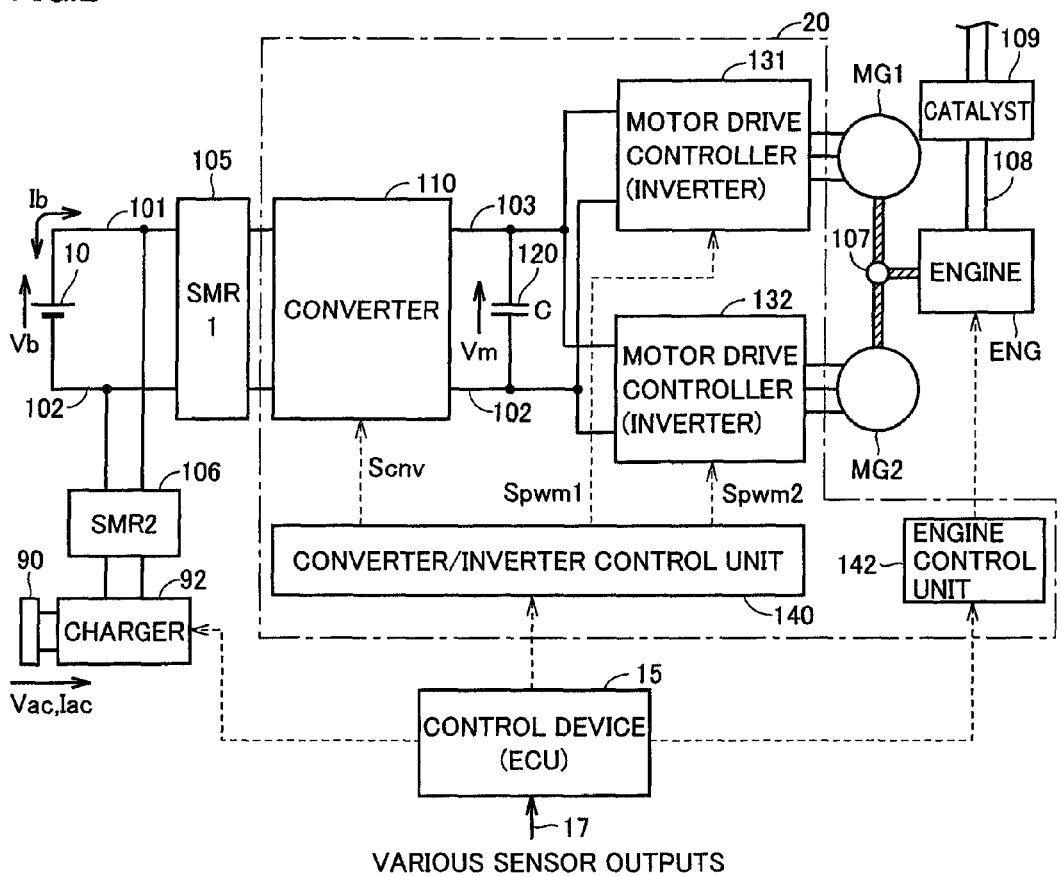
FIG. 2 is a block diagram representing a configuration of an electric system of the hybrid vehicle of FIG. 1.

FIG. 2 is a block diagram representing a configuration of the electric system of hybrid vehicle 100 shown in FIG. 1. Referring to FIG. 2, the electric system includes power storage device 10, SMRs (System Main Relay) 105 and 106, PCU 20, motor generators MG1 and MG2, ECU 15, charging inlet 90, and charger 92.

Motor generators MG1 and MG2 are connected to an engine ENG and driving wheels not shown (front wheels 50L and 50R of FIG. 1) via the power split device. Hybrid vehicle 100 can run using engine ENG and motor generator MG2. Motor generator MG1 starts engine ENG and generates electric power using the driving force of engine ENG.

Engine ENG converts the thermal energy caused by burning fossil fuel such as gasoline or light oil, or alcohol fuel such as ethanol, into the motion energy of a kinetic element such as a piston or rotor, and provides the converted motion energy to power split device 107. For example, if the kinetic element is a piston and the motion thereof is a reciprocating motion, the reciprocating motion is converted to rotational motion via the so-called crank mechanism such that the motion energy of the piston is conveyed to power split device 107.

Catalyst device 109 is provided at an exhaust pipe 108 of engine ENG to purify exhaust gas output from engine ENG. Catalyst device 109 can purify the regulation-subject component in the exhaust gas sufficiently at the point of time when the catalyst temperature is increased by the exhaust gas of engine ENG and the catalyst is activated.

SMR 105 is provided between power storage device 10 and PCU 20, and is set on in response to a command from ECU 15 in the event of a vehicle running. SMR 106 is provided between power storage device 10 and charger 92, and is set on according to a command from ECU 15 in the event of an external charging.

PCU 20 includes a converter 110, a capacitor 120, motor drive controllers 131 and 132, a converter/inverter control unit 140 and engine control unit 142. In the present embodiment, motor generators MG1 and MG are AC motors, and motor drive controllers 131 and 132 are formed of inverters. Hereinafter, motor drive controller 131 (132) is also referred to as "inverter 131 (132)".

Converter 110 boosts a voltage Vm between a positive line 103 and a negative line 102 to a level greater than or equal to voltage Vb of power storage device 10 based on a control signal Scnv from converter/inverter control unit 140. Converter 110 is constituted of a current invertible type boost chopper circuit.

Inverters 131 and 132 are provided corresponding to motor generators MG1 and MG2, respectively. Inverters 131 and 132 are connected to converter 110 parallel to each other for driving motor generators MG1 and MG2 based on control signals Spwm1 and Spwm2, respectively, from converter/inverter control unit 140.

Converter/inverter control unit 140 generates control signals Scnv, Spwm1 and Spwm2 for driving converter 110, motor generator MG1 and motor generator MG2, respectively, based on control command values received from ECU 15 (the target value of voltage Vm, the torque target value of motor generators MG1, MG2, and the like). Converter/inverter control unit 140 outputs the generated control signals Scnv, Spwm1 and Spwm2 to converter 110, inverter 131, and inverter 132, respectively.

Engine control unit 142 calculates the rotational speed and output torque of engine ENG based on a control command value received from ECU 15. Engine control unit 142 generates a control signal to drive engine ENG based on the calculated result, and provides the generated control signal to engine ENG.

According to various sensor outputs 17, ECU 15 carries out various control such as controlling the running mode of hybrid vehicle 100, engine ENG start/stop determination, charging and discharging control of power storage device 10, warm-up control of catalyst device 109, and the like. ECU 15 generates a control command value to drive PCU 20, and provides the generated control command value to converter/inverter control unit 140 and engine control unit 142 of PCU 20. ECU 15 generates and provides to charger 92 a signal for driving charger 92 in external charging.

Figure 3:
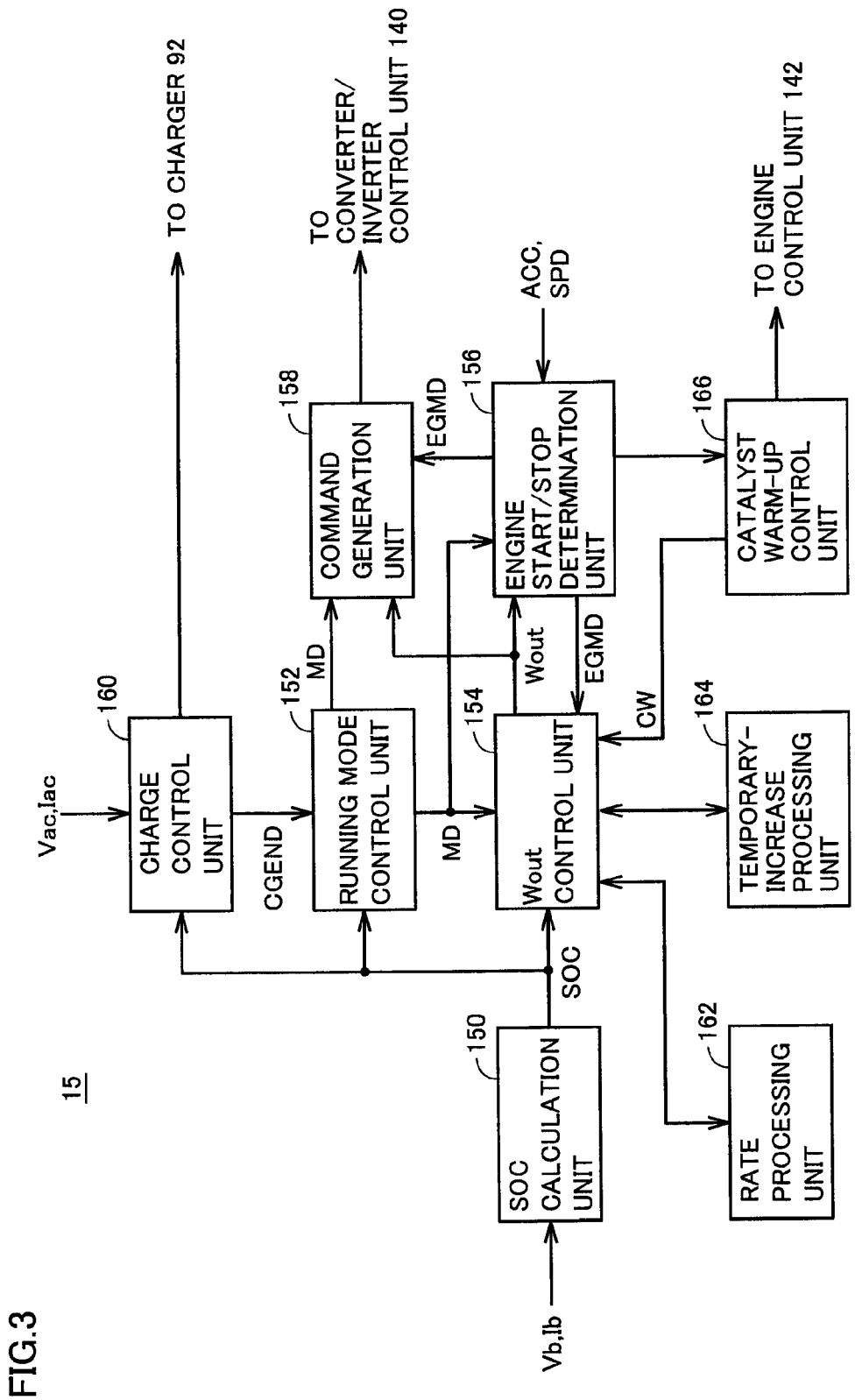
FIG. 3 is a functional block diagram of the ECU in FIG. 2.

FIG. 3 is a functional block diagram of ECU 15 in FIG. 2. Referring to FIG. 3, ECU 15 includes an SOC calculation unit 150, a running mode control unit 152, a Wout control unit 154, and an engine start/stop determination unit 156. ECU 15 further includes a command generation unit 158, a charge control unit 160, a rate processing unit 162, a temporary-increase processing unit 164 and catalyst warm-up control unit 166.

SOC calculation unit 150 calculates the SOC indicating the charging state of power storage device 10 based on voltage Vb and current Ib of power storage device 10 detected by a sensor not shown. The SOC represents in 0-100% the stored amount relative to a fully charged state of power storage device 10, and indicates the remaining stored amount in power storage device 10. For the method of calculating this SOC, various well-known methods can be employed.

Running mode control unit 152 controls the switching of the vehicle running mode based on the SOC calculated by SOC calculation unit 150. Specifically, running mode control unit 152 controls the switching to a CD mode in which engine ENG is stopped and running using motor generator MG2 alone is given priority, or a CS mode in which engine ENG is operated and the SOC of power storage device 10 is maintained at a predetermined target.

Even in the CD mode, the operation of engine ENG is allowed such as when the accelerator pedal is stepped on greatly by the driver, when an engine driving type air conditioner is operated, when in an engine warm-up state, warm-up of catalyst device 109, or the like. The CD mode corresponds to a running mode in which the electric power stored in the power storage device 10 is basically used as the energy source for running the vehicle without maintaining the SOC of power storage device 10. During the CD mode, the ratio of discharging is eventually relatively greater than charging. In contrast, the CS mode is a running mode in which engine ENG is operated as necessary and power is generated by motor generator MG1 for maintaining the SOC of power storage device 10 at a predetermined target level, and is not limited to running with engine ENG always operated.

In other words, even if the running mode is at the CD mode, engine ENG will be operated if the accelerator pedal is stepped on greatly and large vehicle power is required. Furthermore, even if the running mode is at the CS mode, engine ENG will stop when the SOC exceeds the target value. Thus, irrespective of these running modes, running with engine ENG stopped and using motor generator MG2 alone is referred to as "EV running", whereas running with engine ENG operated and using motor generator MG2 and engine ENG is referred to as "HV running".

Figure 4:
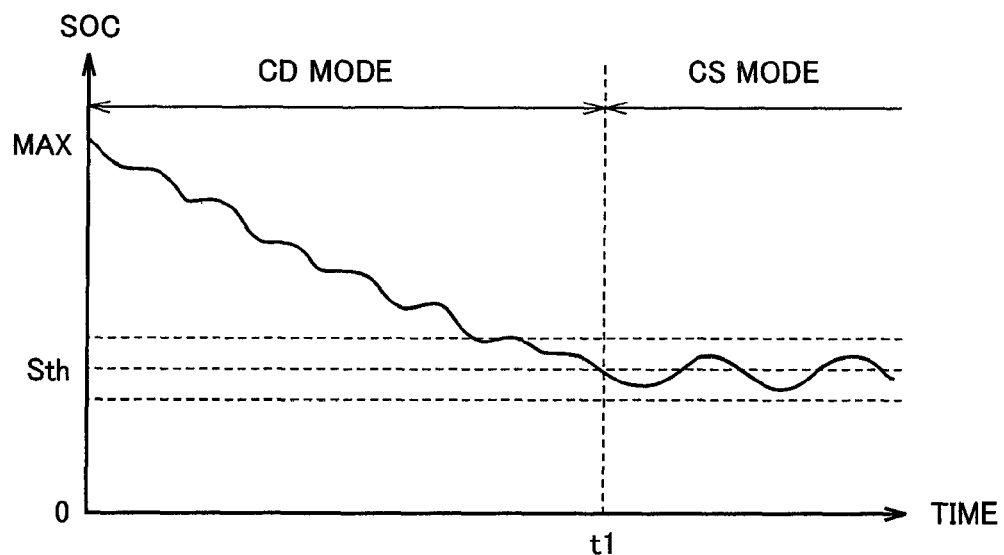
FIG. 4 represents the relationship between the change in SOC of the power storage device and the running mode.

FIG. 4 represents the relationship between the change in the SOC of power storage device 10 and the running mode. Referring to FIG. 4, it is assumed that running is started after power storage device 10 attains a fully charged state (SOC=MAX) by external charging. Following external charging, the running mode is set at the CD mode. During running in a CD mode, the SOC generally decreases in accordance with increase of the running distance although the SOC may temporarily be increased by the regenerative electric power generated at the time of speed reduction or the like. When the SOC attains a threshold value Sth at time t1, the running mode is switched to the CS mode, and the SOC is regulated at the vicinity of threshold value Sth.

Referring to FIG. 3 again, running mode control unit 152 sets the running mode at the CD mode upon receiving a charging end signal CGEND indicating the termination of external charging from charge control unit 160. Then, running mode control unit 152 outputs a mode signal MD indicating whether the running mode is at the CD mode or CS mode to Wout control unit 154, engine start/stop determination unit 156, and command generation unit 158.

Wout control unit 154 receives the SOC of power storage device 10 from SOC calculation unit 150 and mode signal MD indicating the running mode from running mode control unit 152. Wout control unit 154 receives an engine mode signal EGMD indicating whether engine ENG is operated or stopped from engine start/stop determination unit 156. Furthermore, Wout control unit 154 receives a warm-up signal CW indicating whether catalyst device 109 (FIG. 2) is currently warmed up or not from catalyst warm-up control unit 166. Based on these signals, Wout control unit 154 calculates discharge allowable power Wout indicating the electric power (W) that can be discharged from power storage device 10.

Figure 5:
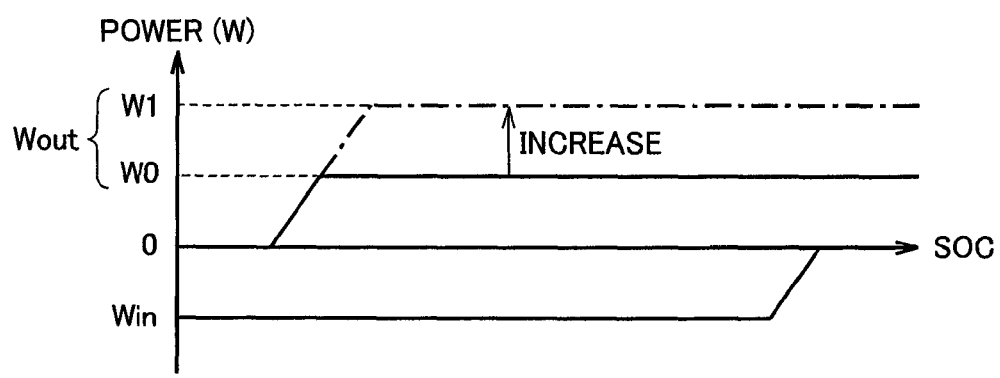
FIG. 5 represents the discharge allowable power of the power storage device.

FIG. 5 represents discharge allowable power Wout of power storage device 10. Referring to FIG. 5, discharge allowable power Wout represents the maximum level of the electric power (W) that can be output from power storage device 10. When the SOC of power storage device 10 decreases, discharge allowable power Wout is controlled to prevent overdischarging.

In the present embodiment, discharge allowable power Wout is modified based on the vehicle running mode, operation/stop of engine ENG, and whether catalyst device 109 is currently warmed up or not, as will be described afterwards. Specifically, when the running mode is at the CD mode and engine ENG is operated, or when the running mode is at the CS mode, discharge allowable power Wout is set at the default value of W0. When the running mode is at the CD mode and engine ENG is stopped, discharge allowable power Wout is increased from W0 to a predetermined W1. Furthermore, even when the running mode is at the CD mode and engine ENG is operating, or even when the running mode is at the CS mode, discharge allowable power Wout is increased from W0 to W1 during warm-up of catalyst device 109.

Charging allowable power Win is the maximum value of electric power (W) that can be input to power storage device 10. Charging allowable electric power Win is restricted when the SOC of power storage device 10 becomes high to prevent overdischarging.

Referring to FIG. 3 again, Wout control unit 154 calculates discharge allowable power Wout (default value W0) based on the SOC of power storage device 10, the temperature, and the like using a map prepared in advance. Wout control unit 154 modifies discharge allowable power Wout based on the running mode indicated by mode signal MD received from running mode control unit 152, engine ENG operation/stop indicated by engine mode signal EGMD signal from engine start/stop determination unit 156, and whether catalyst device 109 is currently warmed up or not, indicated by a warm-up signal CW received from catalyst warm-up control unit 106.

When catalyst device 109 is not currently warmed up, as shown in FIG. 6, Wout control unit 154 increases discharge allowable power Wout from W0 to a predetermined W1 (FIG. 5) in the case where the running mode is at the CD mode and engine ENG is stopped. In contrast, in the case where the running mode is at the CD mode and engine ENG is operating, or when the running mode is at the CS mode, Wout control unit 154 does not increase discharge allowable power Wout.

The reason why discharge allowable power Wout is increased when the running mode is at the CD mode and engine ENG is stopped is to minimize the starting frequency of engine ENG to extend EV running. In other words, when the accelerator pedal is stepped on and the vehicle required power exceeds discharge allowable power Wout even if the running mode is at the CD mode, engine ENG is started and the vehicle is switched from EV running to HV running to satisfy the required power.

However, the driver cannot enjoy the sense of EV running sufficiently if engine ENG is frequently started in response to stepping on the accelerator pedal. The present embodiment is directed to improving the sense of EV running by increasing discharge allowable power Wout to suppress the frequency of starting engine ENG when the running mode is at the CD mode and engine ENG is stopped.

In the present embodiment, discharge allowable power Wout is not always increased. Discharge allowable power Wout is not increased when the running mode is at the CD mode and engine ENG is operated, or when the running mode is at the CS mode. This is to suppress increase of the heat load on electrical components (mainly converter 110), and to avoid the change in the vehicle acceleration property between applying or not applying the present embodiment when the engine is operated and when running in the CS mode.

When catalyst device 109 is currently warmed up, Wout control unit 154 increases discharge allowable power Wout from W0 to W1 even when the running mode is at the CD mode and engine ENG is operated, or even when the running mode is at the CS mode, as shown in FIG. 7.

This arrangement is directed to preventing interruption of the warm-up of catalyst device 109. In other words, when the running mode is at the CD mode and engine ENG is stopped, i.e., when discharge allowable power Wout is increased, the initiation of warm-up of catalyst device 109 to prepare for HV running causes discharge allowable power Wout to return to W0 from W1 by engine ENG being started to warm up catalyst device 109. If the vehicle required power is greater than discharge allowable power Wout (W0), the warm up of catalyst device 109 will be interrupted to cause HV running to be initiated under a state where catalyst device 109 is not yet warmed up. The present embodiment is directed to preventing warm-up of catalyst device 109 from being interrupted by increasing discharge allowable power Wout when catalyst device 109 is currently warmed up, even when the running mode is at the CD mode and engine ENG is operated, or even when the running mode is at the CS mode.

Referring to FIG. 3 again, Wout control unit 154 outputs discharge allowable power Wout subjected to the modification processing set forth above based on the running mode, engine ENG operation/stop, and whether catalyst device 109 is currently warmed up or not, to engine start/stop determination unit 156 and command generation unit 158. When discharge allowable power Wout is increased, Wout control unit 154 notifies temporary-increase processing unit 164 (described afterwards) that discharge allowable power Wout is increased.

Engine start/stop determination unit 156 receives discharge allowable power Wout from Wout control unit 154. Engine start/stop determination unit 156 receives mode signal MD indicating the running mode from running mode control unit 152. Engine start/stop determination unit 156 carries out a start determination and stop determination of engine ENG based on the running mode and discharge allowable power Wout.

Specifically, engine start/stop determination unit 156 calculates the vehicle required power based on an accelerator pedal position ACC, vehicle speed SPD, and the like received as various sensor outputs 17 (FIG. 1). As shown in FIG. 8, when the running mode is at the CD mode, engine start/stop determination unit 156 calculates the maximum power that can be output from motor generator MG2 based on the increased discharge allowable power Wout (W1 in FIG. 5), and carries out a start determination and stop determination of engine ENG based on the comparison result between the calculated maximum power and vehicle required power.

In other words, although the discharge allowable power Wout is non-increased (default value W0) during operation of engine ENG when the running mode is at the CD mode (FIG. 6), as set forth above, increased discharge allowable power Wout (W1) is used for the stop determination of engine ENG. Accordingly, the stopping of engine ENG is facilitated after engine ENG is started in a CD mode, allowing the sense of EV running to be further improved.

When the running mode is at the CS mode, engine start/stop determination unit 156 calculates the maximum power of motor generator MG2 based on the non-increased discharge allowable power Wout (W0), and carries out a start determination and stop determination of engine ENG based on the comparison result between the calculated maximum power and vehicle required power.

Referring to FIG. 3 again, command generation unit 158 generates a control command value for driving PCU 20 (for example, target value of voltage Vm, torque target value of motor generators MG1, MG2, and the like), based on the running mode, discharge allowable power Wout, and the engine mode indicating the operation/stop state of engine ENG. Command generation unit 158 outputs the generated control command value to converter/inverter control unit 140 (FIG. 2) of PCU 20.

When an external power supply is connected to charging inlet 90 (FIG. 2), charge control unit 160 generates and provides to charger 92 a control signal for driving charger 92, based on an input voltage Vac and input current Iac detected by sensors not shown. When the SOC of power storage device 10 received from SOC calculation unit 150 reaches a predetermined upper limit value, charge control unit 160 ends the charging control and outputs a charging end signal CGEND indicating the end of charging to running mode control unit 152. Accordingly, the running mode is set at the CD mode at running mode control unit 152, as described above.

Rate processing unit 162 applies rate processing to the modification of discharge allowable power Wout when discharge allowable power Wout is increased from W0 to W1 and when discharge allowable power Wout returns to W0 from W1 at Wout control unit 154. At this stage, rate processing unit 162 sets the modifying rate when discharge allowable power Wout returns to W0 from W1 smaller than the modifying rate when discharge allowable power Wout is increased from W0 to W1. Accordingly, the exceedance of the discharging electric power from power storage device 10 over discharge allowable power Wout due to the delay in the followability of electric power control can be suppressed.

In other words, rate processing unit 162 sets the modifying rate when discharge allowable power Wout is increased from W0 to W1 greater than the modifying rate when discharge allowable power Wout is returned to W0 from W1. Thus, the hold-off state of the vehicle caused by insufficient output when switching from the HV running to EV running in a CD mode can be prevented.

Temporary-increase processing unit 164 temporarily increases discharge allowable power Wout of power storage device 10 when a great amount of electric power is temporarily required such as when engine ENG is to be cranked up by motor generator MG1. When temporary-increase processing unit 164 has received a notification indicating that discharge allowable power Wout is currently increased from Wout control unit 154, the temporary-increasing processing of discharge allowable power Wout is set non-executable. This is because the increasing processing by temporary-increase processing unit 164 is not required since discharge allowable power Wout is already increased by Wout control unit 154.

When engine ENG is started during modification of discharge allowable power Wout (that is, when increasing from W0 to W1, or when returning to W0 from W1), it is desirable that discharge allowable power Wout is maintained during startup of engine ENG at Wout control unit 154. Also, when engine ENG is started at the time of switching the running mode (when switching from a CD mode to CS mode, or from a CS mode to CD mode), it is desirable that discharge allowable power Wout is maintained during startup of engine ENG. By way of example, the value of discharge allowable power Wout is maintained at the value corresponding to when startup of engine ENG is initiated. Accordingly, the engine starting processing is stabilized since the electric power output from power storage device 10 at the time of starting engine ENG is stable.

When a determination result of starting engine ENG is received from engine start/stop determination unit 156, catalyst warm-up control unit 166 outputs a command designating execution of warm-up of catalyst device 109 to engine control unit 142 when warm-up of catalyst device 109 is not carried out. Then, catalyst warm-up control unit 166 renders active a warm-up signal CW output to Wout control unit 154 during warm-up of catalyst device 109.

Figure 9:
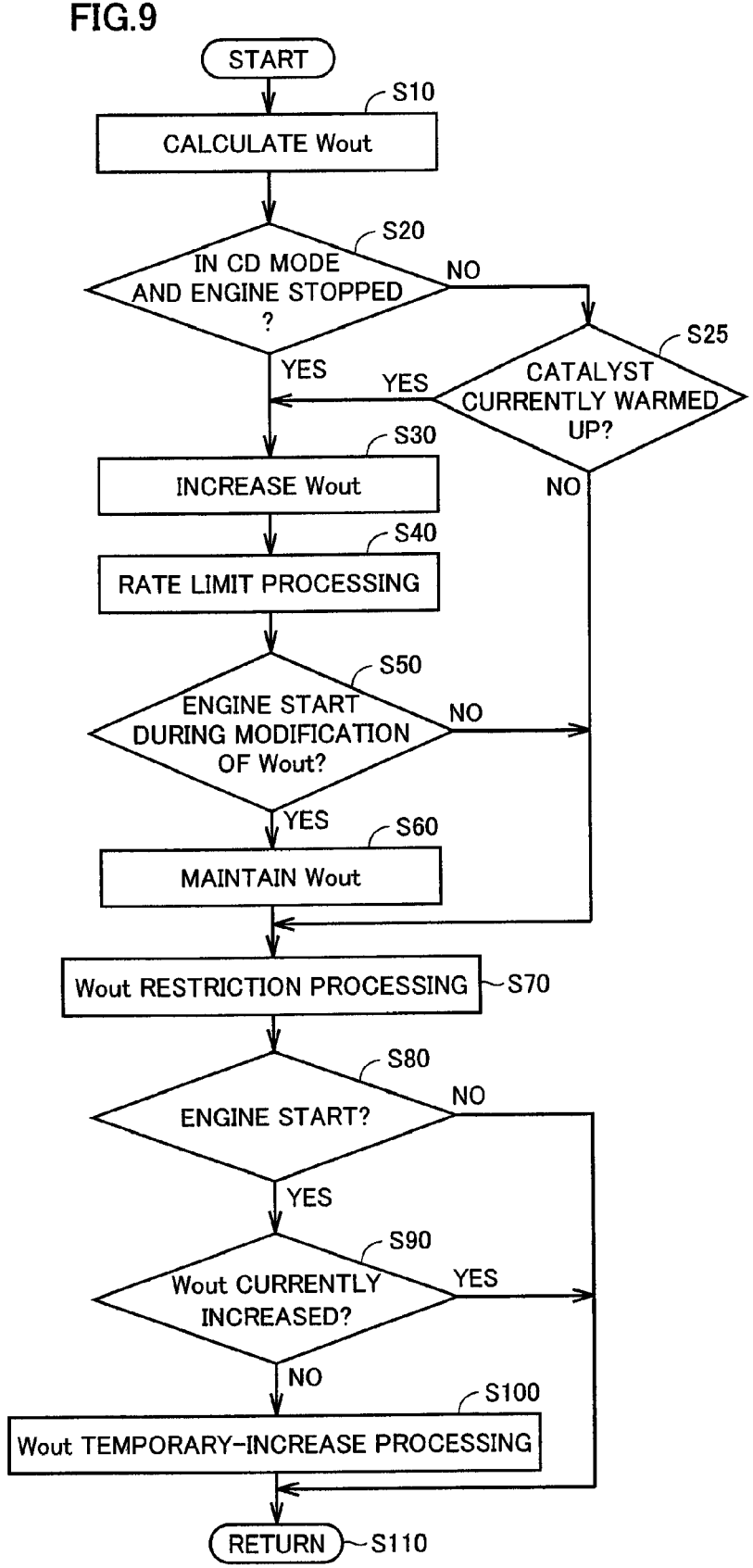
FIG. 9 is a flowchart to describe a series of procedures related to control of discharge allowable power.

FIG. 9 is flowchart to describe a series of procedures related to control of discharge allowable power Wout. Referring to FIG. 9, ECU 15 uses a map or the like prepared in advance to calculate discharge allowable power Wout (default value W0) (step S10).

ECU 15 determines whether the running mode is at the CD mode and engine ENG is stopped or not (step S20). When a determination is made that the running mode is not at the CD mode (i.e. at the CS mode), or when engine ENG is operating (NO at step S20), ECU 15 determines whether catalyst device 109 is currently warmed up or not (step S25). When a determination is made that catalyst device 109 is not currently warm-up (NO at step S25), ECU 15 proceeds to step S70 that will be described afterwards.

When a determination is made at step S20 that the running mode is at the CD mode and engine ENG is stopped (YES at step S20), or when a determination is made at step S25 that catalyst device 109 is currently warmed-up (YES at step S25), ECU 15 increases discharge allowable power Wout from W0 to a predetermined W1, as shown in FIG. 5 (step S30).

When discharge allowable power Wout is to be modified, ECU 15 executes rate limit processing in which the modifying rate of discharge allowable power Wout is limited (step S40). Further, ECU 15 determines whether a starting request of engine ENG is made during modification of discharge allowable power Wout (step S50). When a determination is made that starting of engine ENG is required during modification of discharge allowable power Wout (YES at step S50), ECU 15 maintains discharge allowable power Wout (step S60). By way of example, discharge allowable power Wout is maintained at a value corresponding to when start-up of engine ENG is requested.

Then, ECU 15 carries out Wout restriction processing (step S70). By way of example, discharge allowable power Wout is limited when the SOC of power storage device 10 becomes low, as shown in FIG. 5. Alternatively, discharge allowable power Wout may be limited when the temperature of converter 110 rises or the like.

Then, ECU 15 determines whether starting of engine ENG is requested or not (step S80). When a determination is made that starting of engine ENG is requested (YES at step S80), ECU 15 further determines whether discharge allowable power Wout is currently increased or not (step S90). When a determination is made that discharge allowable power Wout is not currently increased (YES at step S90), ECU 15 executes the temporary-increasing processing of discharge allowable power Wout (step S100).

In other words, when a determination is made that discharge allowable power Wout is currently increased at step S90 (YES at step S90), a determination is made that temporary-increasing processing is not required since discharge allowable power Wout is already increased. Therefore, control proceeds to step S110 without executing step S100.

Figure 10:
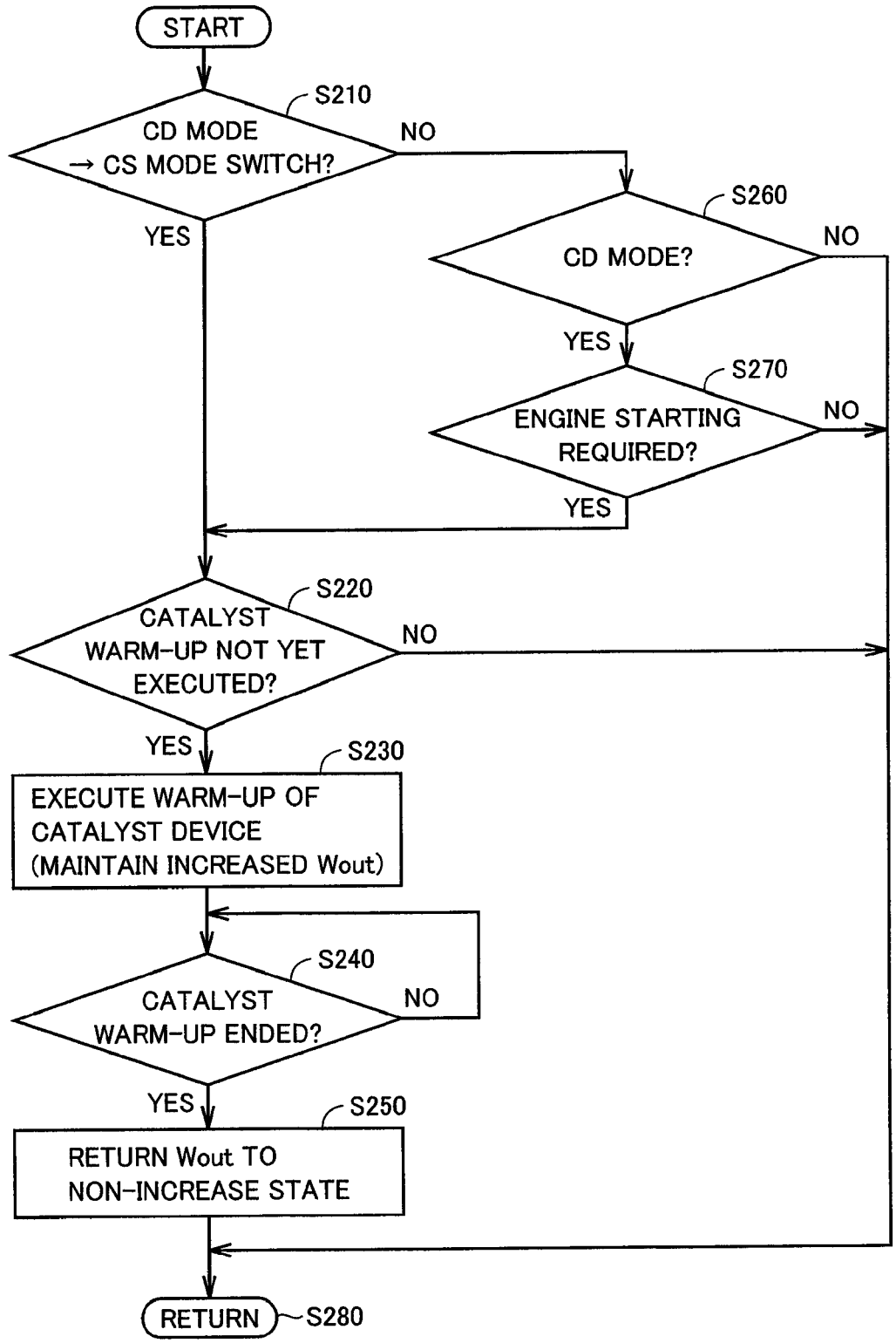
FIG. 10 is a flowchart to describe the procedure related to warm-up control of the catalyst device.

FIG. 10 is a flowchart to describe the procedure related to warm-up control of catalyst device 109. Referring to FIG. 10, ECU 15 determines whether the running mode is to be switched from the CD mode to the CS mode based on the SOC of power storage device 10 (FIG. 2) (step S210). When a determination is made that the running mode is to be switched from the CD mode to CS mode (YES at step S210), ECU 15 determines whether warm-up of catalyst device 109 has already been executed or not (step S220).

When a determination is made that warm-up of catalyst device 109 has already been executed (NO at step S220), ECU 15 proceeds to step S280 without executing the subsequent processing. In contrast, when a determination is made that warm-up of catalyst device 109 is not yet executed at step S220 (YES at step S220), ECU 15 starts engine ENG for the purpose of warming up at catalyst device 109 to execute warm-up of catalyst device 109 (step S230).

It is to be noted that prior to execution of the warm-up of catalyst device 109, discharge allowable power Wout of power storage device 10 is increased to W1 since the running mode is at the CD mode and engine ENG is stopped. Although engine ENG is to be started in association with initiating warm-up of catalyst device 109, ECU 15 maintains the increase of discharge allowable power Wout during warm-up of catalyst device 109, as set forth above. When warm-up of catalyst device 109 ends (YES at step S240), ECU 15 returns discharge allowable power Wout to the non-increase state of W0 from W1 (step S250).

When a determination is made that there is no switching to the CS mode from the CD mode at step S210 (NO at step S210), ECU 15 determines whether the current running mode is at the CD mode or not (step S260). When a determination is made that the running mode is at the CD mode (YES at step S260), ECU 15 determines whether starting of engine ENG is required or not (step S270). When a determination is made that starting of engine ENG is required (YES at step S270), ECU 15 proceeds to the processing of step S220.

In other words, when starting of engine ENG is required in a CD running mode, warm-up of catalyst device 109, if not yet executed, is executed at step S230. At this stage, since the running mode is at the CD mode and engine ENG is stopped prior to execution of warm-up of catalyst device 109, discharge allowable power Wout of power storage device 10 has been increased to W1. ECU 15 executes warm-up of catalyst device 109 while maintaining the increase of discharge allowable power Wout.

When a determination is made that the running mode is at the CS mode at step S260 (NO at step S260), or when a determination is made that starting of engine ENG is not required at step S270 (NO at step S270), ECU 15 proceeds to the processing of step S280.

Figure 11:
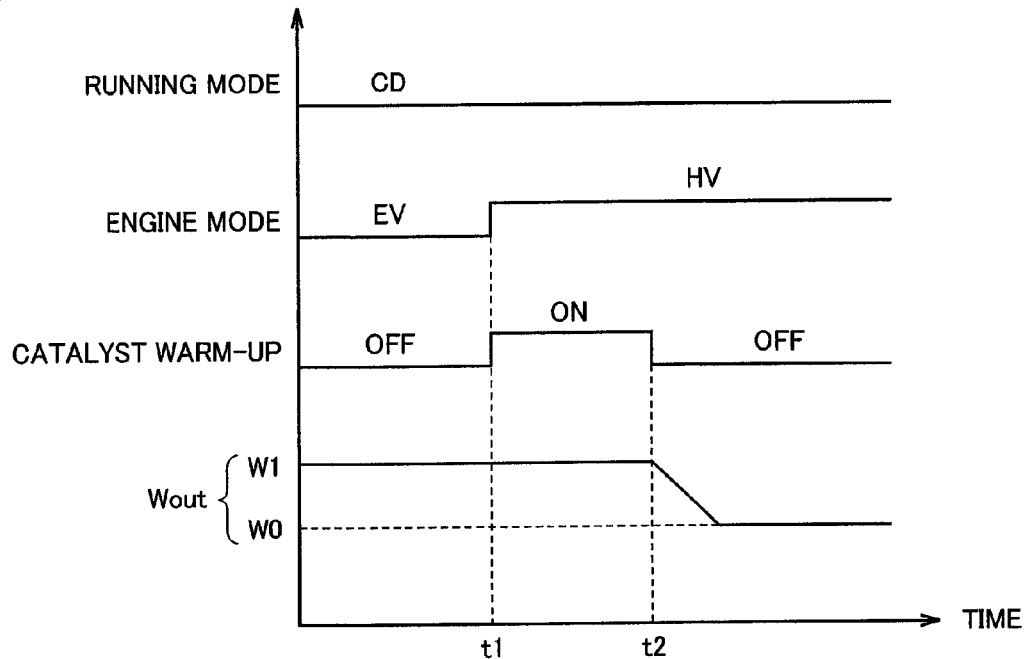
FIG. 11 represents the change in discharge allowable power when the engine is to be started in a CD mode.

FIG. 11 represents the change in discharge allowable power Wout when engine ENG is started in a CD mode. Referring to FIG. 11, "EV" of the engine mode refers to EV running with engine ENG stopped. "HV" refers to HV running with engine ENG operating.

Prior to time t1, engine ENG is stopped (engine mode "EV"), and discharge allowable power Wout is increased to W1. At time t1, engine ENG is started to begin the warm-up of catalyst device 109 (assuming that warm-up of catalyst device 109 was not yet executed). Until time t2 when warm-up of catalyst device 109 ends, discharge allowable power Wout is maintained at W1 despite the operation of engine ENG since catalyst device 109 is currently warmed up. When warm-up of catalyst device 109 ends at time t2, discharge allowable power Wout returns to the non-increase state of W0 from W1.

Figure 12:
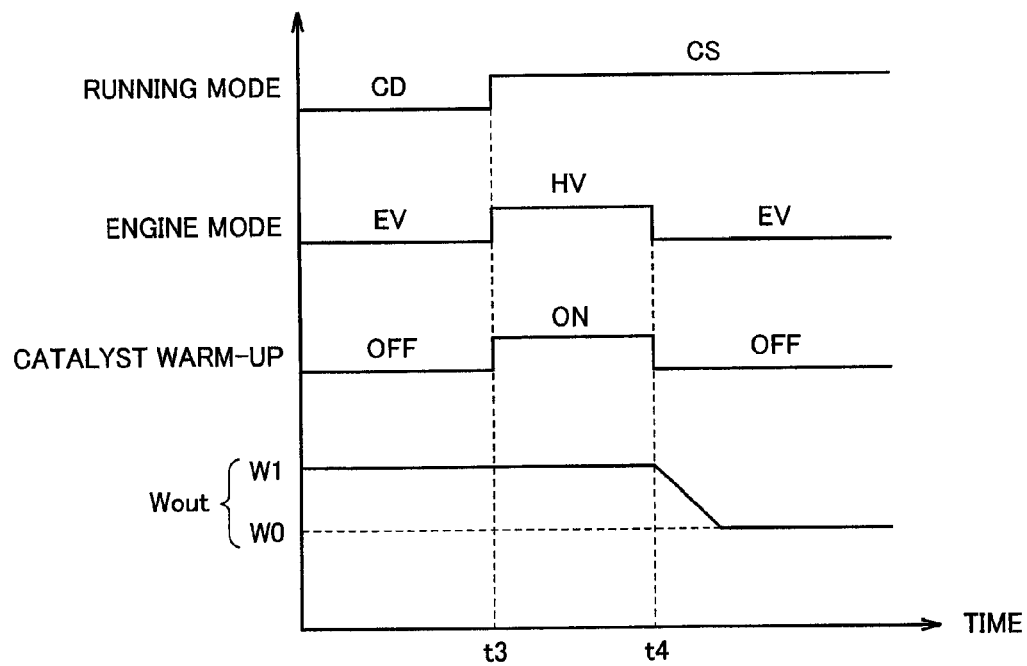
FIG. 12 represents the change in discharge allowable power when the running mode is switched from a CD mode to a CS mode.

FIG. 12 represents the change in discharge allowable power Wout when the running mode is switched from the CD mode to the CS mode. Referring to FIG. 12, it is assumed that, prior to time t3, the running mode is at the CD mode and engine ENG is stopped (EV running). Therefore, discharge allowable power Wout is increased to W1.

When the SOC of power storage device 10 reaches threshold value Sth at time t11, the running mode is switched to the CS mode (FIG. 4). Accordingly, engine ENG is started, and warm-up of catalyst device 109 begins (assuming that warm-up of catalyst device 109 was not yet executed). Before time t4 when warm-up of catalyst device 109 ends, discharge allowable power Wout is maintained at W1 despite the operation of engine ENG since catalyst device 109 is currently warmed up. When the warm-up of catalyst device 109 ends at time t4, discharge allowable power Wout returns to W0 from W1.

Thus, when the running mode is at the CD mode and engine ENG is stopped in the present embodiment, discharge allowable power Wout is increased than when the running mode is at the CD mode and engine ENG is operating, or than when the running mode is at the CS mode. Accordingly, the running power during EV running can be ensured while increase of heat load on electrical components can be suppressed during operation of engine ENG and during the CS mode. Thus, EV running can be extended while giving consideration of heat load on electrical components in the present embodiment.

Even when the running mode is at the CD mode and engine ENG is operated, or even when the running mode is at the CS mode in the present embodiment, discharge allowable power Wout is increased in the case where catalyst device 109 is currently warmed up, likewise with when the running mode is at the CD mode and engine ENG is stopped. Accordingly, interruption of the warm-up of catalyst device 109 due to discharge allowable power Wout returning to the non-increase state will not occur. Thus, according to the present embodiment, EV running can be extended and interruption of warm-up of catalyst device 109 can be prevented.

In the present embodiment, a charging inlet 90 and a charger 92 for external charging are provided, and the running mode is set at the CD mode after external charging. Therefore, according to the present embodiment, EV running can be extended increased using electric power through external charging.

The above embodiment has been described based on a configuration in which only one power storage device 10 and one converter 110 are provided. However, the present invention is also applicable to an electric system in which a plurality of power storage devices and converters are provided (for example, an electric system including a plurality of power storage devices, and a plurality of converters connected parallel thereto).

Furthermore, although the embodiment has been described in which external charging is carried out with an external power supply connected to charging inlet 90, external charging may be carried out by a non-contact feeding method such as by resonance, electromagnetic induction, and the like.

In the foregoing, engine ENG corresponds to an example of "internal combustion engine" of the present embodiment. Motor generator MG2 corresponds to an example of "electric motor" of the present invention. Furthermore, Wout control unit 154 corresponds to an example of "discharge allowable power control unit" of the present invention. Charging inlet 90 and charger 92 constitute an example of "charging device" of the present invention.

It should be understood that the embodiments disclosed herein are illustrative and nonrestrictive in every respect. The scope of the present invention is defined by the terms of the claims, rather than the description of embodiment set forth above, and is intended to include any modification within the scope and meaning equivalent to the terms of the claims.

REFERENCE SIGNS LIST 10 power storage device;
15 ECU;
17 various sensor outputs;
20 PCU;
30 power output device;
35 accelerator pedal;
40 DG;
50L, 50R front wheel;
60L, 60R rear wheel;
70L, 70R front seat;
80 rear seat;
90 charging inlet;
92 charger;
100 hybrid vehicle;
105, 106 SMR;
107 power split device;
108 exhaust pipe;
109 catalyst device;
110 converter;
120 capacitor;
131, 132 inverter;
140 converter/inverter control unit;
142 engine control unit;
150 SOC calculation unit;
152 running mode control unit;
154 Wout control unit;
156 engine start/stop determination unit;
158 command generation unit;
160 charge control unit;
162 rate processing unit;
164 temporary-increase processing unit;
166 catalyst warm-up control unit;
MG1, MG2 motor generator;
ENG engine.

The invention claimed is:

1. A control device for a hybrid vehicle,
said hybrid vehicle including
an internal combustion engine generating vehicle driving force,
a power storage device capable of being charged and discharged,
an electric motor receiving supply of electric power from said power storage device for generating vehicle driving force, and
a catalyst device purifying exhaust gas of said internal combustion engine by catalysis, said control device comprising:
a running mode control unit controlling switching of a running mode including a first mode in which said internal combustion engine is not operated to maintain a state of charge indicating a charging state of said power storage device, and a second mode in which said internal combustion engine is operated or stopped, and said internal combustion engine is operated to maintain said state of charge, and a discharge allowable power control unit increasing, when said running mode is at said first mode and said internal combustion engine is stopped, a discharge allowable power that can be discharged by said power storage device than when the running mode is at said first mode and said internal combustion engine is operating, or than when said running mode is at said second mode, even when said running mode is at said first mode and said internal combustion engine is operating, or even when said running mode is at said second mode, said discharge allowable power control unit increases said discharge allowable power in a case where said catalyst device is currently warmed up, than when said catalyst device is not currently warmed up.

2. The control device for a hybrid vehicle according to claim 1, wherein, when said discharge allowable power is increased in a case where said running mode is at said first mode and said internal combustion engine is stopped, said discharge allowable power control unit does not reduce said increased discharge allowable power even when said internal combustion engine is operated if said catalyst device is currently warmed up.

3. The control device for a hybrid vehicle according to claim 2, wherein, when said discharge allowable power is increased in a case where said running mode is at said first mode and said internal combustion engine is stopped, said discharge allowable power control unit does not reduce said increased discharge allowable power even when said internal combustion engine is operated if said catalyst device is currently warmed up, and then, when warm-up of said catalyst device ends during continuous operation of said internal combustion engine, reduces said increased discharge allowable power.

4. The control device for a hybrid vehicle according to claim 3, wherein warm-up of said catalyst device is initiated when said running mode is switched from said first mode to said second mode.

5. The control device for a hybrid vehicle according to claim 3, wherein a temperature of said catalyst device is less than a predetermined temperature during warm-up of said catalyst device, and the temperature of said catalyst device is greater than or equal to the predetermined temperature after warm-up of said catalyst device ends.

6. The control device for a hybrid vehicle according to claim 2, wherein, when said discharge allowable power is increased in a case where said running mode is at said first mode and said internal combustion engine is stopped, said discharge allowable power control unit does not reduce said increased discharge allowable power even when said internal combustion engine is operated if said catalyst device is currently warmed up, and reduces said increased discharge allowable power when said internal combustion engine is operated if not during warm-up of said catalyst device.

7. The control device for a hybrid vehicle according to claim 6, wherein warm-up of said catalyst device is initiated when said running mode is switched from said first mode to said second mode.

8. The control device for a hybrid vehicle according to claim 6, wherein a temperature of said catalyst device is less than a predetermined temperature during warm-up of said catalyst device, and the temperature of said catalyst device is greater than or equal to the predetermined temperature after warm-up of said catalyst device ends.

9. The control device for a hybrid vehicle according to claim 1,
said hybrid vehicle further including a charging device configured to receive supply of electric power from a power supply external to the vehicle to charge said power storage device,
wherein said running mode control unit sets said running mode at said first mode after said power storage device is charged by said charging device.

10. A control device for a hybrid vehicle,
said hybrid vehicle including
an internal combustion engine generating vehicle driving force,
a power storage device capable of being charged and discharged,
an electric motor receiving supply of electric power from said power storage device for generating vehicle driving force, and
a catalyst device purifying exhaust gas of said internal combustion engine by catalysis,
said control device comprising:
a running mode control unit switching a running mode to a first mode in which the vehicle runs without maintaining a state of charge indicating a charging state of said power storage device until said state of charge is lowered to a predetermined threshold value, and to a second mode in which the vehicle runs with said state of charge maintained when said state of charge reaches said predetermined threshold value, and
a discharge allowable power control unit increasing, when said running mode is at said first mode and said internal combustion engine is stopped, a discharge allowable power that can be discharged by said power storage device, than when said running mode is at said first mode and said internal combustion engine is operating, or than when said running mode is at said second mode,
even when said running mode is at said first mode and said internal combustion engine is operating, or even when said running mode is at said second mode, said discharge allowable power control unit increases said discharge allowable power in a case where said catalyst device is currently warmed up, than when said catalyst device is not currently warmed up.

11. A control device for a hybrid vehicle,
said hybrid vehicle including
an internal combustion engine generating vehicle driving force,
a power storage device capable of being charged and discharged,
an electric motor receiving supply of electric power from said power storage device for generating vehicle driving force, and
a catalyst device purifying exhaust gas of said internal combustion engine by catalysis,
said control device comprising:
a running mode control unit controlling switching of a running mode including a first mode in which the hybrid vehicle runs with at least said electric motor as a driving force source and a state of charge indicating a charging state of said power storage device becoming lower in accordance with increase of a running distance, and a second mode in which said internal combustion engine is operated or stopped, the hybrid vehicle runs with at least one of said internal combustion engine and said electric motor as the driving force source, and said state of charge is maintained, and a discharge allowable power control unit increasing, when said running mode is at said first mode and said internal combustion engine is stopped, a discharge allowable power that can be discharged by said power storage device than when said running mode is at said first mode and said internal combustion engine is operating, or than when said running mode is at said second mode, even when said running mode is at said first mode and said internal combustion engine is operating, or even when said running mode is at said second mode, said discharge allowable power control unit increases said discharge allowable power in a case where said catalyst device is currently warmed up, than when said catalyst device is not currently warmed up.

12. A hybrid vehicle including a control device defined in claim 1.

* * * * *